United States Patent
Ui et al.

(10) Patent No.: US 6,473,112 B1
(45) Date of Patent: Oct. 29, 2002

(54) IMAGE FORMING APPARATUS

(75) Inventors: Makoto Ui; Fumio Haibara; Jun Yokobori; Tetsuya Niitsuma; Norio Joichi, all of Tokyo (JP)

(73) Assignee: Konica Corporation, Tokyo (JP)

( * ) Notice: Subject to any disclaimer, the term of this patent is extended or adjusted under 35 U.S.C. 154(b) by 39 days.

(21) Appl. No.: 09/694,749

(22) Filed: Oct. 23, 2000

(30) Foreign Application Priority Data

Oct. 24, 1999 (JP) .......................................... 11-302438

(51) Int. Cl.$^7$ ............................................... B41J 2/435
(52) U.S. Cl. ...................................... 347/248; 347/234
(58) Field of Search ............................... 347/234, 235, 347/248, 250, 262, 264, 116; 399/394, 395

(56) References Cited

U.S. PATENT DOCUMENTS

| 4,814,792 A | * | 3/1989 | Yamanobe et al. ......... 347/248 |
| 5,610,721 A | | 3/1997 | Higuchi et al. ............. 358/296 |

FOREIGN PATENT DOCUMENTS

| JP | 63-149670 | * | 6/1988 | ........... G03G/15/04 |
| WO | WO95/13678 | | 5/1995 | |

OTHER PUBLICATIONS

Patent Abstracts of Japan, vol. 1998, No. 01, Jan. 30, 1998 and JP 09–233254 A (Ricoh Co. Ltd.), Sep. 5, 1997—Abstract only.

Patent Abstracts of Japan, vol. 1997, No. 01, Jan. 31, 1997 and JP 08–230231 A (Ricoh Co. Ltd.), Sep. 10, 1996—Abstract only.

Patent Abstracts of Japan, vol. 013, No. 434 (M–1308), Sep. 10, 1992 and JP 04–147874 A (Ricoh Co. Ltd.), May 21, 1992—Abstract only.

Patent Abstracts of Japan , vol. 012, No. 133 (P–693), Apr. 22, 1998 and JP 62–254160 A (Toshiba Corp.), Nov. 5, 1987—Abstract only.

* cited by examiner

*Primary Examiner*—Hai Pham
(74) *Attorney, Agent, or Firm*—Frishauf, Holtz, Goodman & Chick, P.C.

(57) ABSTRACT

The invention concerns an image forming apparatus provided with an automatic writing-position determining device for forming an image always at a correct position on the recording material. The image forming apparatus includes an image forming section to form an image by writing each of scanning lines, an end position detecting section to detect an end position of a recording material in a direction orthogonal to a conveyance direction of the recording material, and a selecting section to select either an automatic writing-position determining mode or a predetermined writing-position determining mode. When the selecting section selects the automatic writing-position determining mode, the image forming section commences an image writing action from a writing start position determined on the basis of a detected result of the end position detecting device. When the selecting section selects the predetermined writing-position determining mode, the image forming section commences the image writing action from a predetermined writing start position set in advance.

7 Claims, 12 Drawing Sheets

IMAGE FORMING APPARATUS

BACKGROUND OF THE INVENTION

The present invention relates to an image forming apparatus provided with an automatic writing-position determination means for always forming an image at a correct position on the recording material, by correcting an image writing-position corresponding to an offset of the recording material, according to the detection result obtained by detecting an offset of the recording material.

The correction of the image writing-position is the control to change the start position of writing by the writing means 3, 4 corresponding to the end positions. X, X' when the recording materials 10a and 10b are supplied onto the photoreceptor 1 respectively with the end positions X, X', as shown in FIG. 9, and controlled as described above, by the automatic writing-position determination means.

An image forming apparatus, in which the automatic writing-position determination means is assembled, is disclosed in, for example, Japanese Patent No. 2550558, or Japanese Tokuganhei No. 11-77728 specification. The image forming apparatus disclosed in Japanese Patent No. 2550558 detects the offset of the recording material by a plurality of detection elements, and according to the detection results, corrects the position of the image data in a memory. Because the resolving power of the offset detection corresponds to the number of the detection elements, the resolving power of the offset detection is limited. However, the image forming apparatus disclosed in Japanese Tokuganhei No. 11-77728 detects the offset by a detection resolving power of more than 0.25 mm, and corrects the offset with a highly accurate offset correction by fully using the control capability of the writing-position which is owned by the digital writing means such as the writing means by a laser light emitting element.

As described above, in the automatic writing-position determination means disclosed in Japanese Tokuganhei No. 11-77728, the resolving power of the end position detection means is matched with that of the writing means, and the high accuracy offset correction equal to the resolving power of the writing means can be conducted. However, when the automatic writing-position determination means is actually used, there are various problems.

An image position on the recording material when an image is written on the recording material by laser writing as an example, will be described below.

The image position in the main scanning direction at the time of writing, is controlled by adjusting the writing start position in the main scanning direction of writing by the laser, and in the sub-scanning direction, it is controlled by adjusting the timing of the conveyance of the recording material and writing. The position of the writing start in the main scanning direction is determined by the calculation from the offset information from the end position detection means and the information of the size of the recording material. However, the recording materials used for the image formation are various in size and kind. Because there is a case in which the detection of the position of the recording material is difficult, and also a case in which the recording material with the irregular type size apart from the regular type size is used, there is a case where the offset correction by the automatic end position detection means is difficult, and highly reliable offset correction is not conducted.

SUMMARY OF THE INVENTION

To overcome the abovementioned drawbacks in conventional image forming apparatus, it is an object of the present invention to solve the above problems in the offset correction using the automatic writing-position determination means, and to provide an image forming apparatus provided with the automatic writing-position determination means by which the offset correction can be conducted with the high accuracy, and the highly reliable automatic writing-position determination is conducted.

Accordingly, to overcome the cited shortcomings, the abovementioned object of the present invention can be attained by image forming apparatus described as follow.

(1) An image forming apparatus, comprising: an image forming section to form an image by writing each of scanning lines; an end position detecting section to detect an end position of a recording material in a direction orthogonal to a conveyance direction of the recording material conveyed to an image forming position; and a selecting section to select either an automatic writing-position determining mode or a predetermined writing-position determining mode, wherein, when the selecting section selects the automatic writing-position determining mode, the image forming section commences an image writing action from a writing start position determined on the basis of a detected result of the end position detecting device, while, when the selecting section selects the predetermined writing-position determining mode, the image forming section commences the image writing action from a predetermined writing start position set in advance.

(2) The image forming apparatus of item 1, wherein the selecting section includes an automatic selector.

(3) The image forming apparatus of item 1, wherein the selecting section includes a manual selector.

(4) The image forming apparatus of item 1, further comprising: a plurality of sheet feeding sections, wherein, when a specific sheet feeding section included in the plurality of sheet feeding sections is currently employed, the selecting section selects the automatic writing-position determining mode, while, when a sheet feeding section, included in the plurality of sheet feeding sections other than the specific sheet feeding section, is currently employed, the selecting section selects the predetermined writing-position determining mode.

(5) The image forming apparatus of item 1, further comprising: a discriminating section to discriminate a kind of the recording material to be used, wherein, when the discriminating section determines that a specific kind of the recording material is currently used, the selecting section selects the predetermined writing-position determining mode, while, when the discriminating section determines that a kind of the recording material other than the specific kind of the recording material is currently used, the selecting section selects the automatic writing-position determining mode.

(6) The image forming apparatus of item 1, wherein, when image data for forming the image includes such data that possibly cause an error in detecting the end position of the recording material in a direction orthogonal to the conveyance direction, the selecting section selects the predetermined writing-position determining mode.

(7) The image forming apparatus of item 1, wherein the image forming apparatus is provided with a duplex image forming mode in which a reverse side image is formed on a reverse side of the recording material after an obverse side image is formed on an obverse side of the recording material, and when the reverse side image is formed on the reverse side of the recording material, on the obverse side of which the obverse side image is already formed in the predetermined writing-position determining mode, the selecting section selects the predetermined writing-position determining mode.

(8) The image forming apparatus of item 1, further comprising: a size detecting section to detect a size of the recording material, wherein, when the selecting section selects the predetermined writing-position determining mode, the image forming section commences the image writing action based on a detected result of the size detecting section.

(9) The image forming apparatus of item 1, wherein the image forming section commences the image writing action based on data of writing start positions, which were determined in image forming operations in the past.

(10) An image forming apparatus, comprising: a conveyance section to convey a recording material; an end position detecting section to detect an end position of a recording material in a direction orthogonal to a conveyance direction of the recording material; an edge detecting section to detect a leading or a trailing edge of the recording material; and a triggering section to trigger the end position detecting section, wherein the triggering section includes an offset detecting device to trigger the end position detecting section based on a signal outputted by the edge detecting section or an operating action of the conveyance section.

(11) The image forming apparatus of item 10, wherein either a first mode in which the triggering section triggers the end position detecting section based on the signal outputted by the edge detecting section, or a second mode in which the triggering section triggers the end position detecting section based on the operating action of the conveyance section, can be set by an external operation.

(12) The image forming apparatus of item 10, wherein either a first mode in which the triggering section triggers the end position detecting section based on the signal outputted by the edge detecting section, or a second mode in which the triggering section triggers the end position detecting section based on the operating action of the conveyance section, is automatically selected.

(13) The image forming apparatus of item 11, further comprising: a detecting section to detect a kind of the recording material, wherein either the first mode or the second mode is selected, based on a detected result of the detecting section.

(14) The image forming apparatus of item 13, wherein the kind of the recording material is a size of the recording material.

(15) The image forming apparatus of item 12, further comprising: a detecting section to detect a kind of the recording material, wherein either the first mode or the second mode is automatically selected, based on a detected result of the detecting section.

(16) The image forming apparatus of item 15, wherein the kind of the recording material is a size of the recording material.

(17) The image forming apparatus of item 10, wherein the conveyance section includes a synchronized conveyance device to convey the recording material to an image forming position so as to be synchronized with an image forming operation, and the triggering section triggers the end position detecting section based on control signals for controlling the synchronized conveyance device.

(18) An image forming apparatus, comprising: an image forming section to form an image by writing each of scanning lines, starting from a writing start position; a conveyance section to convey a recording material; an end position detecting section to detect an end position of a recording material in a direction orthogonal to a conveyance direction of the recording material; an edge detecting section to detect a passage of a leading or a trailing edge of the recording material; a triggering section to trigger the end position detecting section based on a signal outputted by the edge detecting section or an operating action of the conveyance section; and a selecting section to select either an automatic writing-position determining mode in which the writing start position is determined, based on a detected result of the end position detecting section, or a predetermined writing-position determining mode in which the writing start position is determined, corresponding to a predetermined writing start position set in advance.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
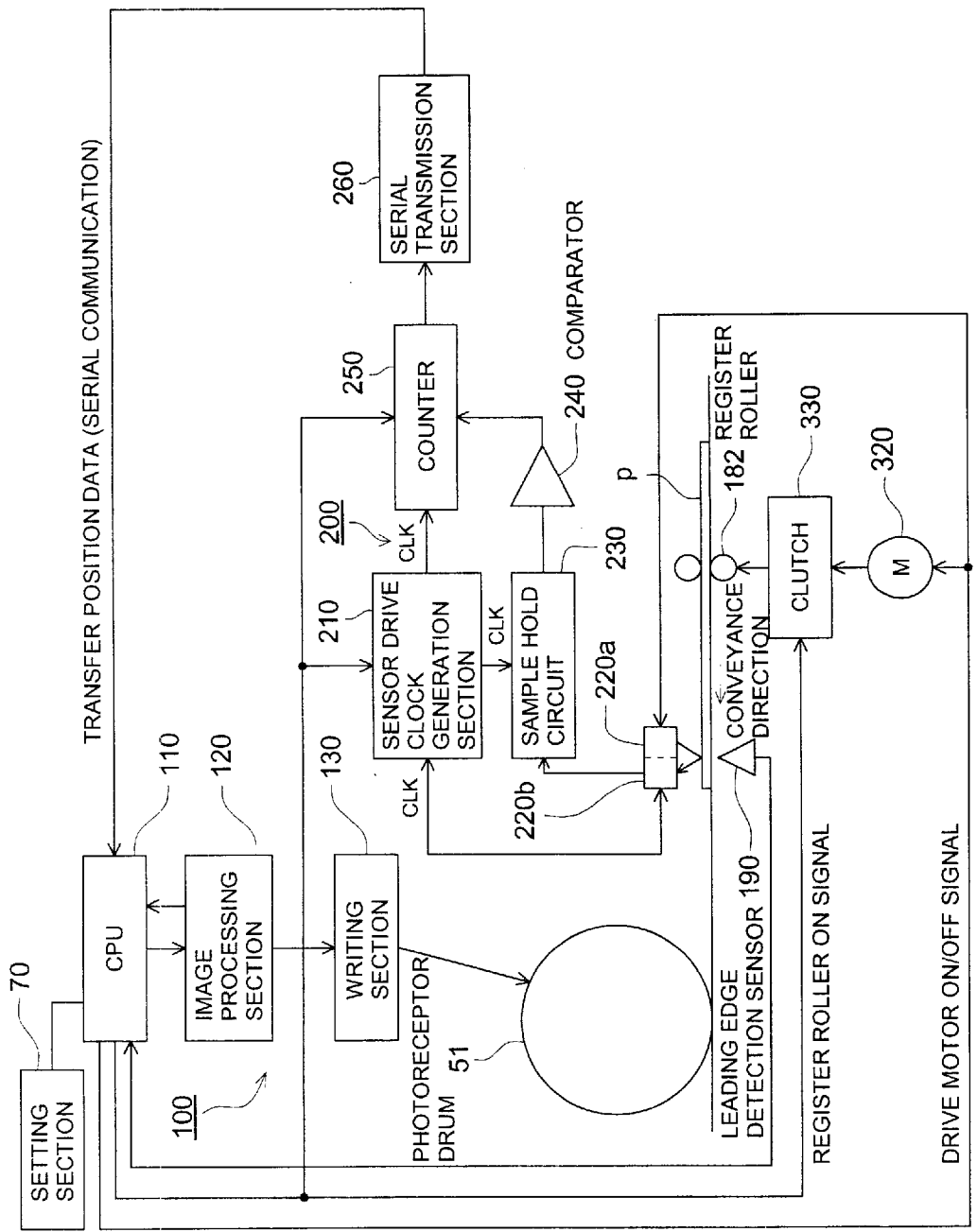
FIG. 1 is a functional block diagram showing the electric structure of an image forming apparatus of an embodiment of the present invention.

Referring to the drawings, an embodiment of the present invention will be detailed below.

Figure 2:
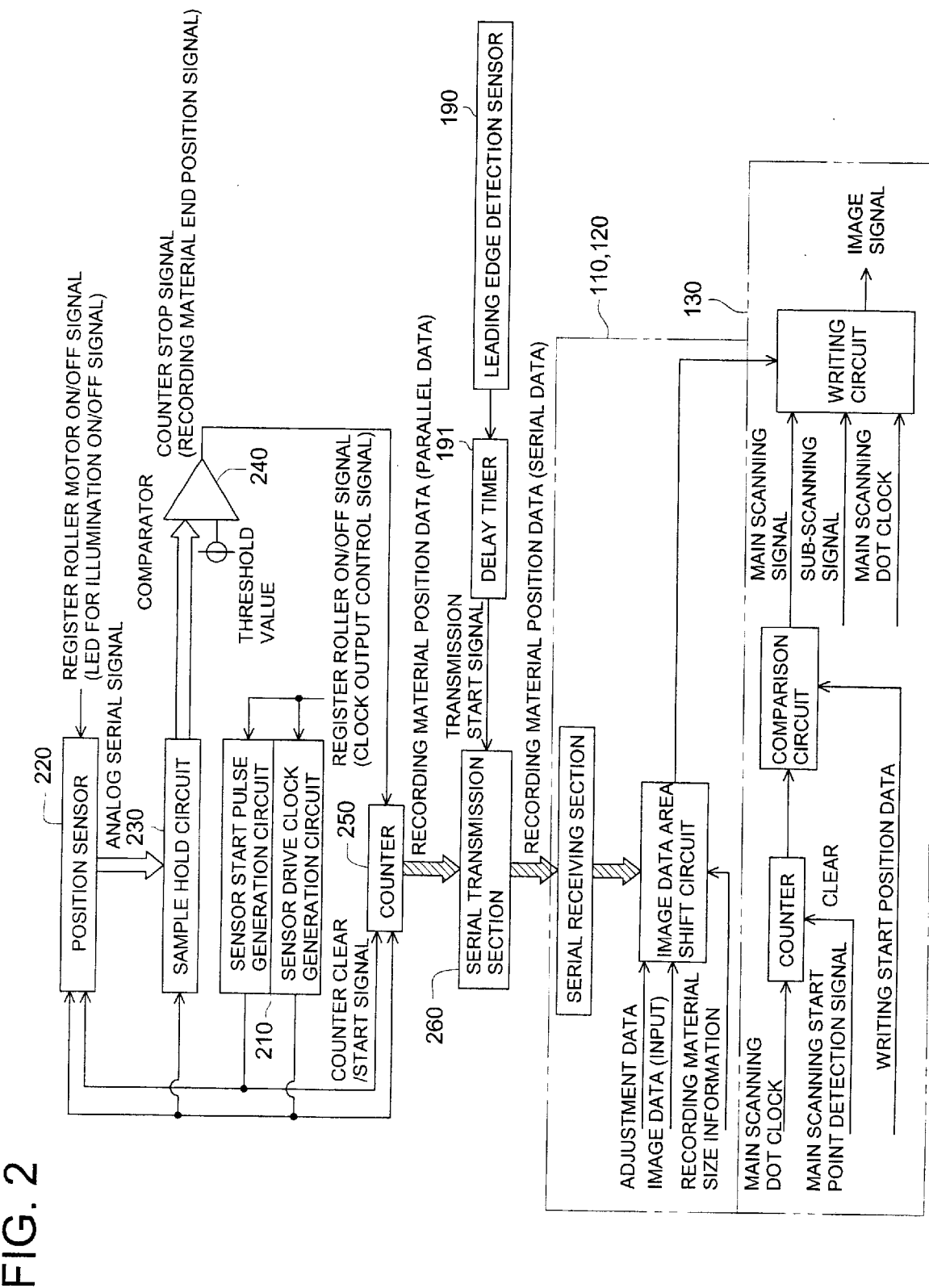
FIG. 2 is a functional block diagram showing the detailed electric structure of a main portion of the image forming apparatus of the embodiment of the present invention.
Figure 3:
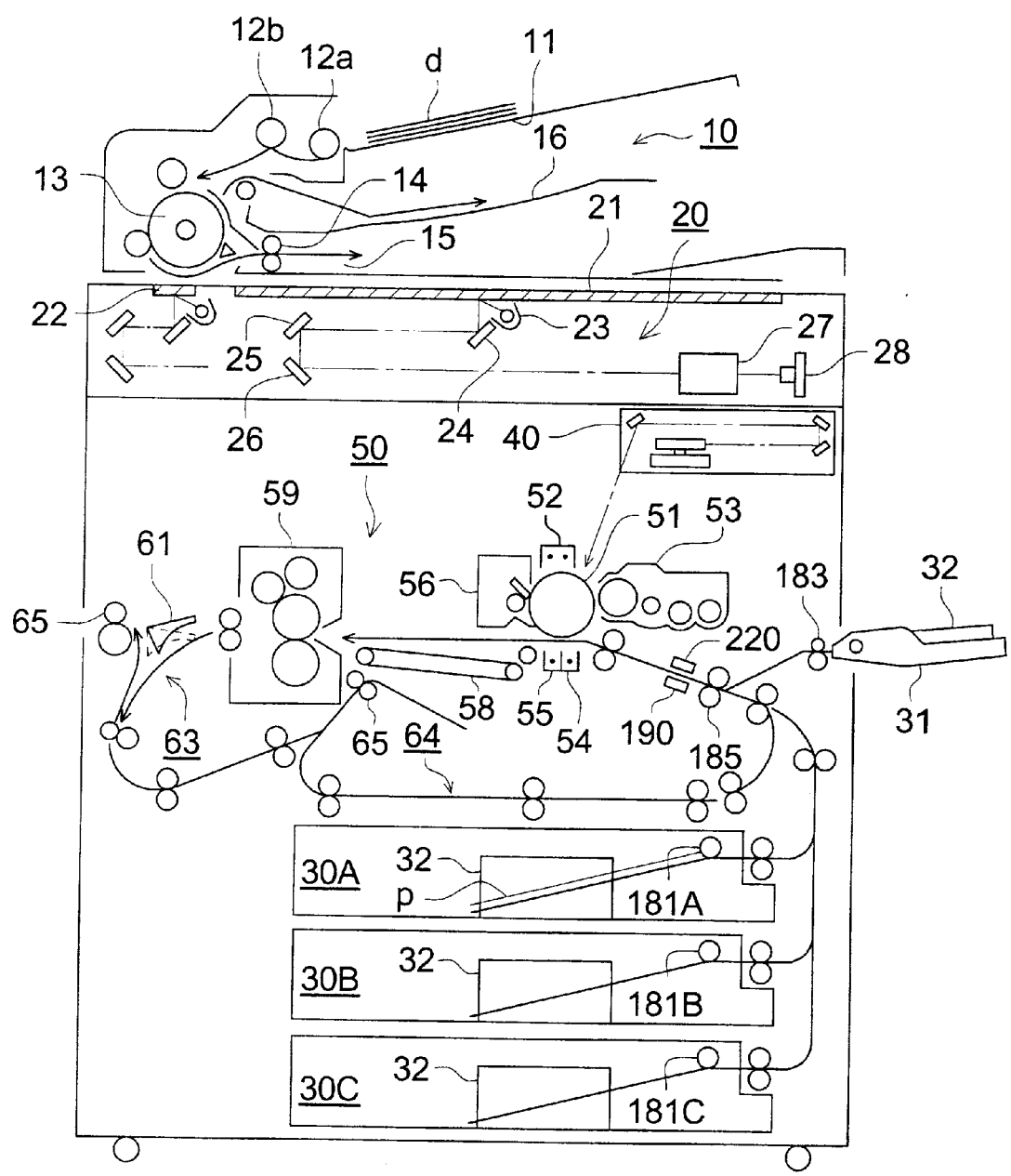
FIG. 3 is a structural view showing the mechanical structure of the image forming apparatus of the embodiment of the present invention.

FIG. 1 is a block diagram showing an example of the electric structure of an image forming apparatus of an embodiment of the present invention. FIG. 2 is a block diagram showing an example of the detailed electric structure of a main portion of the image forming apparatus of the embodiment of the present invention. FIG. 3 is a side sectional view showing the mechanical structure of the image forming apparatus of the embodiment of the present invention.

Initially, referring to FIG. 3, the hole of the image forming apparatus will be described below. Incidentally, in the present embodiment, a copier will be described as the image forming apparatus.

In FIG. 3, a plurality of sheets of documents d under the condition in which the front side of the first page of the document faces upside, are placed on a document placement portion 11 of an ADF 10 which can feed the two-sides of the document. The first sheet of the document fed through a roller 12a and roller 12b is conveyed rotationally through a roller 13.

Next, the document surface of the document d is irradiated by a light source 23, and the reflected light forms an image on the light receiving surface of a CCD 28 which is a photo-electrical conversion means, through an image forming optical system 27 through mirrors 24, 25 and 26. Herein, an image reading section 20 is structured by an optical system having a light source 23, mirrors 24, 25 and 26, image forming optical system 27 and CCD 28, and an optical system driving means, not shown.

In FIG. 3, when the document d is placed on a platen glass 21 under the condition in which the reading surface faces downward, the optical system conducts reading by scanning along the platen glass 21.

Further, when the document d is automatically fed and rotated around the roller 13, the reading is conducted under the condition that the light source 23 and the mirror 24 are fixed under the second platen glass 22.

Then, the image data of the read-out document d is set from the CCD 28 to an image processing section 120, not shown.

Incidentally, in the case where the document d is automatically fed by the ADF 10, when the first page of the document d is read out, next the winding operation using the roller 13 is conducted again through a reversal roller 14, and an image on the rear side of the document is read out by the image reading section 20, and sent to the image processing section 120.

In the manner as described above, the document d whose front side and rear side images are read out, is reversed again by the reversal roller 14, and stacked on a delivery sheet tray 16 under the condition of its front side facing downward.

In the manner as described above, the image data read out by the image reading section 20 is compressed and stored in an image memory, after the predetermined image processing is conducted in the image processing section 120.

On the one hand, a recording material p is fed by a conveyance roller 181 from sheet feed cassettes 30A, 30B, and 30C, as the sheet feeding means in which the recording material is stacked, and fed to an image forming section 50. Further, the recording sheet p is fed from a hand feeding sheet feed tray 31, as a sheet feed means, by a conveyance roller 183, and fed to the image forming section 50.

Then, after the recording material p fed to the image forming section 50 is in timed relationship with a register roller 185 as the conveyance means near its entrance, the recording material p comes close to a photoreceptor drum 51 which is an image carrier. That is, the first conveyance path from the sheet feed cassette 30 to the register roller 185, and the second conveyance path from the hand feeding sheet feed tray 31 to the register roller 185, are provided.

Further, the leading edge of the recording material p in timed relationship with the register roller 185, is detected by a leading edge detection sensor 190, and the passing position in the main scanning direction is detected by a position sensor 220 structured by a close contact type line sensor. Incidentally, the detection of the passing position will be detailed later.

The image data is inputted from the image processing section to the image writing section 40, and the laser light corresponding to the image data is irradiated from a laser diode in a image writing section 40 onto the photoreceptor drum 51, and an electrostatic latent image is formed. By developing the electrostatic latent image by the developing section 53, a toner image is formed on the photoreceptor drum 51.

This toner image is transferred onto the recording material p by a transfer section 54, which forms the transfer position, that is, an image forming position to form the toner image on the recording material p, just below the photoreceptor drum 51. Then, the recording material p in contact with the photoreceptor drum 51 is separated by a separation section 55. The recording material p separated from the photoreceptor drum 51 enters into a fixing section 59 through a conveyance mechanism 58, and the toner image is fixed by the heat and pressure. In the manner described above, the image is formed on the recording material p.

Incidentally, when it is necessary that the sheet is reversed and re-fed at the time of two-sided image formation, the recording material p on which the toner image is fixed, is conveyed downward and enters into a reversal section 63. Next, the recording material p entered in the reversal section 63, is fed again by the reversal roller, and sent again to the image forming section 50 through a reversal conveyance path 64. In the image forming section 50 in which the image formation of one side of the document d is completed, the toner adhered to the photoreceptor drum 51 is removed by a cleaning section 56, and the photoreceptor drum 51 is ready for the next image formation.

Under this condition, the other side (the surface on which the image is not yet formed) of the recording material p is conveyed into the image forming section 50, and the image is formed. The recording material p separated from the photoreceptor drum 51 by the separation section 55, enters again into the fixing section 59 through the conveyance mechanism 53 and is fixed. In this manner, the recording material p, on whose rear side and front side the image formation is completed, or the recording material p, on whose one side the image formation is completed, is delivered to the outside of the apparatus.

Herein, referring to FIG. 1 and FIG. 2, the image forming apparatus of the present embodiment by which the writing-position is determined corresponding to the position of the recording material, and the stable image formation can be realized, will be described.

In FIG. 1 and FIG. 2, numeral 110 is a CPU which is a control means for controlling each section of the image forming apparatus, and for controlling the passing position detection of the recording material p in the present embodiment and the determination of the writing-position. Numeral 120 is an image processing section which receives the information of the writing-position determined by the CPU 110 and controls for displacing the writing-position in the main scanning direction. Numeral 130 is a writing section which receives the processed result in the image processing section 120, and conducts the writing of the image onto the photoreceptor drum 51 by the laser beam.

Incidentally, a processing section 100 composed of the CPU 110, image processing section 120 and writing section 130, is located on a main circuit board.

Further, numeral 210 is a sensor drive clock generation section to generate a sensor drive clock for driving the position sensor, and is structured such that the drive of the position detection sensor and the measurement of the passing position of the recording material are conducted by the sensor drive clock. Numeral 220 is a position sensor structured by the close contact type line sensor driven by the sensor drive clock, and is structured by an LED light source 220a which is a light emitting section, and a line sensor 220b which is a light receiving section.

When a red LED is used as the LED light source 220a, because the responsibility becomes good, it is preferable. Further, a reading sensor of a facsimile device can be used as the light receiving section 220b. Incidentally, in the LED light source 220a and the light receiving section 220b, the light emitting element and the light receiving element may not correspond to each other by 1 to 1.

Numeral 230 is a sample hold circuit which synchronizes the output of the position sensor 220 with the sensor drive clock and samples and holds it. Numeral 240 is a comparator to compare the hold result of the sample hold circuit 230 to a predetermined value (recording material detection level). Numeral 250 is a counter to count the sensor drive clock when the output of the comparator 240 is in the predetermined condition. Numeral 260 is a serial transmission section which converts the count result of the counter 250 into the predetermined serial data, and transmits it by the serial communication.

Incidentally, the sensor drive clock generation section 210, sample hold circuit 230, comparator 240, counter 250, and serial transmission section 260 are arranged in the vicinity of the position sensor 220, and the position sensor 220, sample hold circuit 230 and comparator 240 structure the end position detection means.

Further, numeral 320 is a drive source (drive motor) to drive the register roller 185, and controlled by a drive motor ON/OFF signal from the CPU 110. Numeral 330 is a clutch as a transmission mechanism to transmit the rotational force of the drive motor 320 to the register roller 185 according to a register roller ON signal from the CPU 110.

Figure 4:
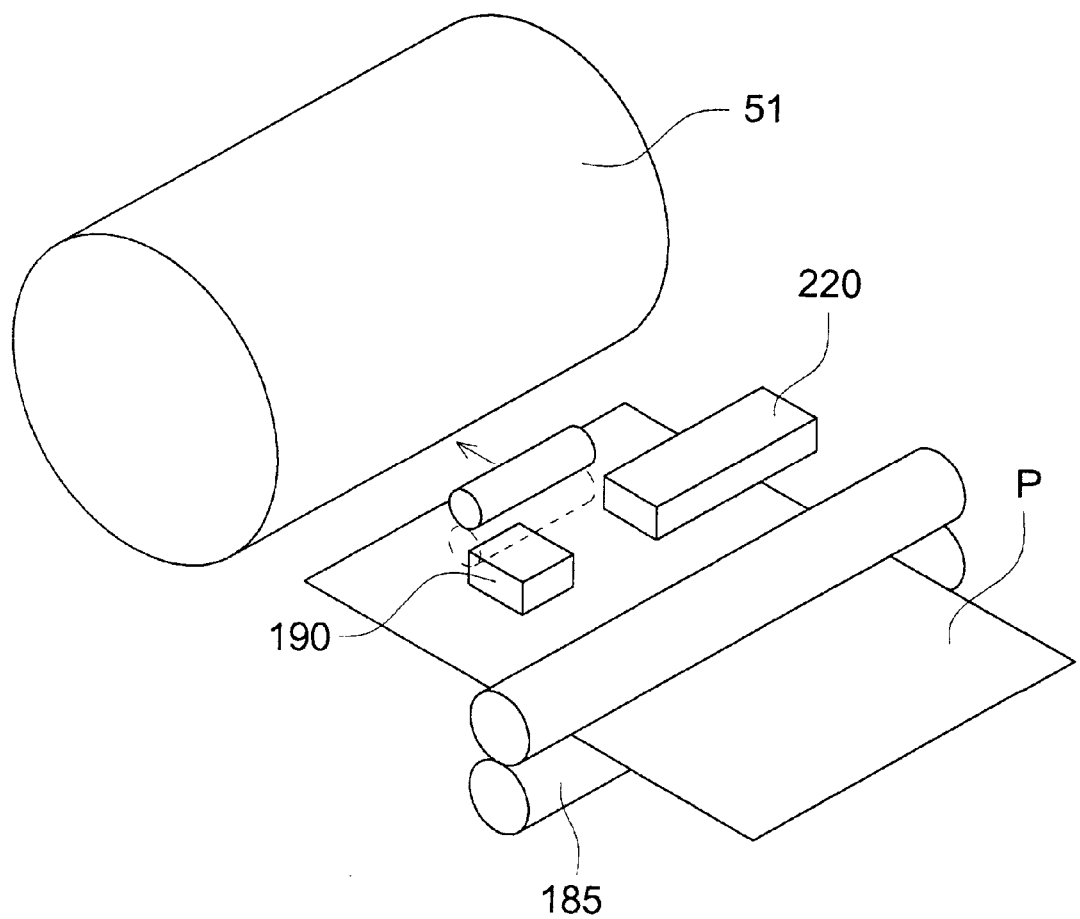
FIG. 4 is a perspective view showing the mechanical arrangement of the main portion of the image forming apparatus of the embodiment of the present invention.
Figure 5:
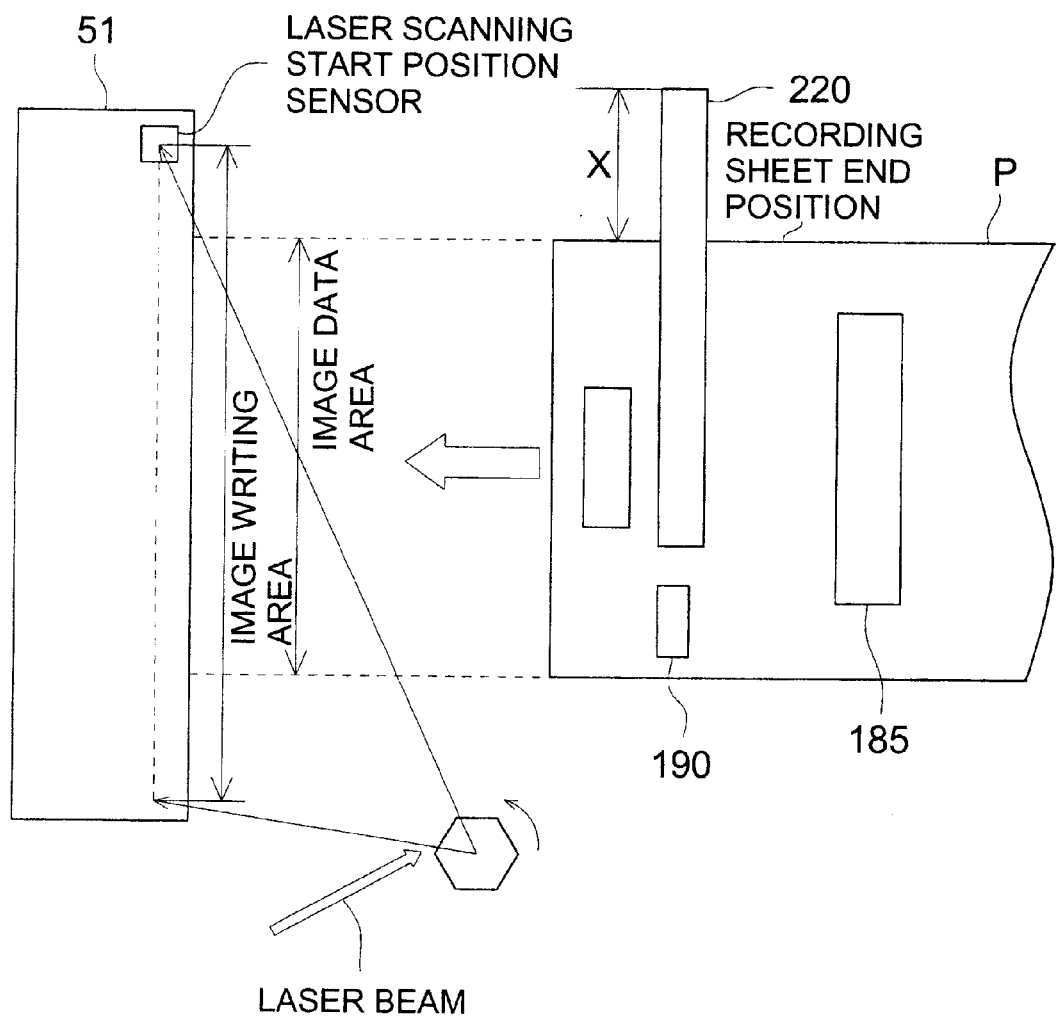
FIG. 5 is a plan view showing the mechanical arrangement of a main portion of the image forming apparatus of the embodiment of the present invention.

Incidentally, when the condition of the arrangement of the photoreceptor drum 51, register roller 185, leading edge detection sensor 190, and position sensor 220 is shown in a perspective view, the positional relationship of them is as shown in FIG. 4 and FIG. 5.

Incidentally, the leading edge detection sensor 190 and the position sensor 220 may be located on the same side as the recording material p, or may be located on both sides so as to sandwich the recording material p.

Further, it is desirable that the leading edge detection sensor 190 and the position sensor 220 are equipped above the conveyance surface of the recording material p, considering the influences of the paper powder, etc.

Figure 6:
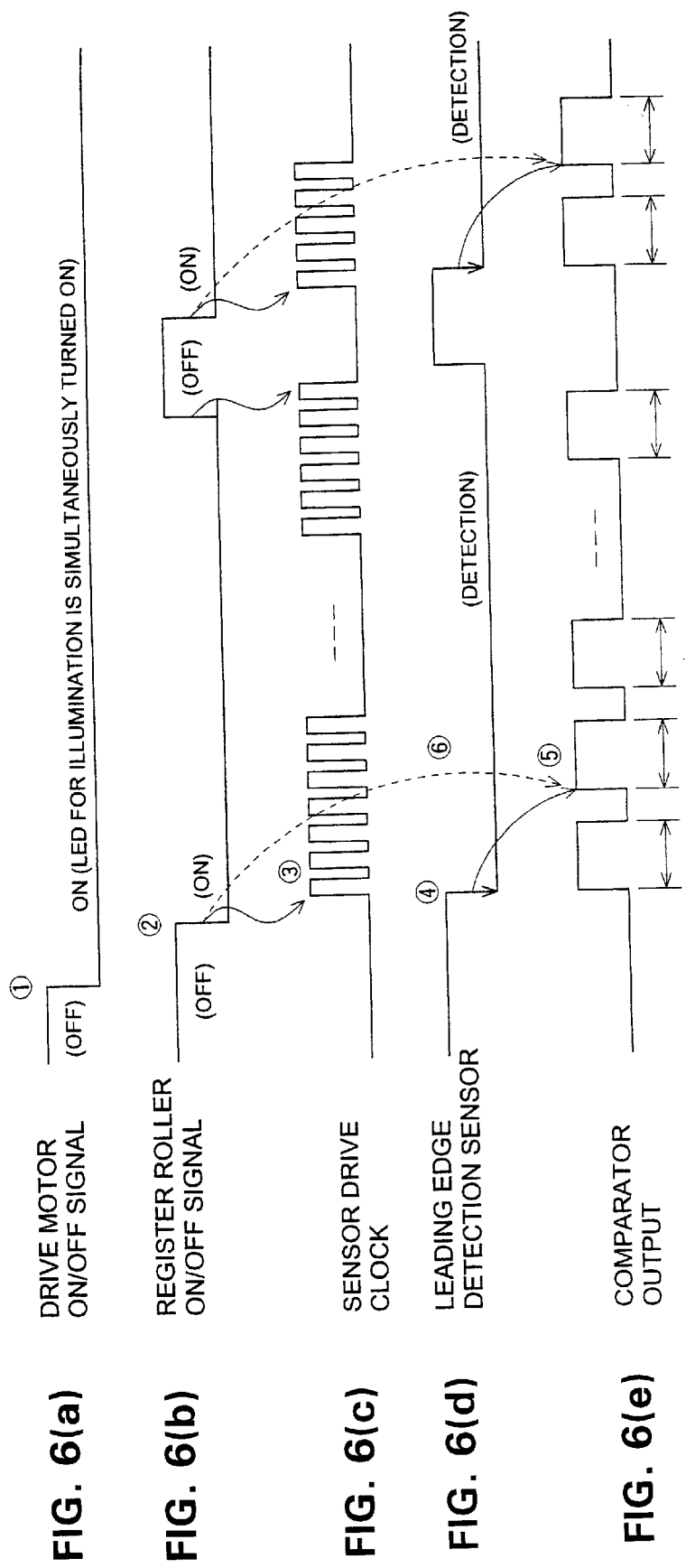
FIGS. 6(a)–6(c) are time charts showing patterns of the signal waveform at the time of operation of the image forming apparatus of the embodiment of the present invention.
Figure 7:
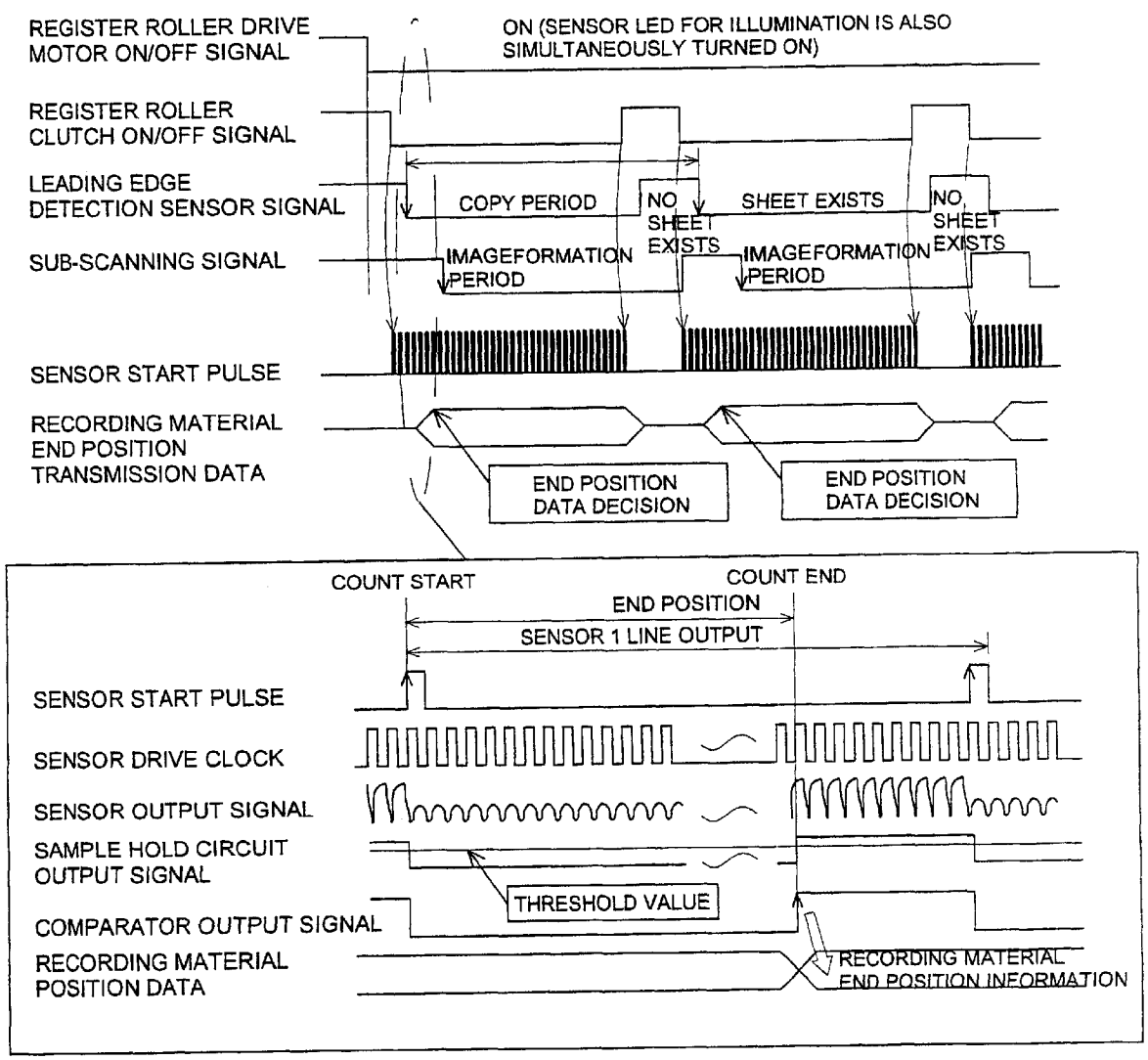
FIG. 7 is a time chart showing patterns of the signal waveform at the time of operation of the image forming apparatus of the embodiment of the present invention.

FIG. 6 is a time chart showing the operation condition of the present embodiment, and FIG. 7 is a time chart showing further detailed condition.

Incidentally, herein, mainly referring to a black diagram in FIG. 1 and a time chart in FIG. 6, the operations will be described. Incidentally, FIG. 6 is shown on the supposition that the L level becomes an active condition.

Initially, with the start of the image formation, the drive motor ON/OFF signal is turned ON-status by the CPU 110, in order to drive the drive motor 320 (FIG. 6(a) (1)).

Then, after that, after the recording material p is conveyed and brought into contact with the register roller 185 and stopped, at the predetermined timing, the register roller ON/OFF signal is turned ON-status so as to start the rotation of the register roller 185 (FIG. 6(b) (2)), and the driving force is supplied to the clutch 330. Thereby, the recording material p starts to be conveyed toward the photoreceptor drum 51.

Incidentally, the LED light source 220 is also driven so as to start the light emission, by the ON of the register roller ON/OFF signal. Further, the sensor drive clock generation section 210 starts to generate the sensor drive clock, by the ON of the register roller ON/OFF signal (FIG. 6 (c) (3)).

Then, the recording material p is conveyed by the drive of the register roller 185 and is detected by the leading edge detection sensor 190 (FIG. 6 (d) (4)).

The passing position of the recording material p in the main scanning direction is detected as an absolute position by the position sensor 220 located at a position whose phase is almost the same as the leading edge detection sensor 190.

In this case, the irradiation light from the LED light source 220a is reflected by the recording material p to the position of the end portion in the main scanning direction of the recording material p, and detected by the light receiving section 220b.

Accordingly, a change point (in FIG. 6(e), a change point of L to H) of the comparator output pulse (FIG. 6(e)) obtained when the output which is sampled and held in the sample hold circuit 230 is compared to a predetermined value in the comparator 240, shows a position of the end portion of the recording material p in the main scanning direction. Therefore, when the pulse width of the comparator output pulse is counted by a counter 250 by using a drive clock, the position of the recording material p in the condition including the recording material size or passing position of the recording material, is obtained.

The serial transmission section 260 transmits the count result of the counter 250 showing the position of the end portion of the recording material p to the CPU 110 as the transfer position data by the serial communication. Incidentally, actually, the comparator output pulse (FIG. 6(e) (5)) after the predetermined time after the leading edge detection sensor 190 detects the recording material p is counted by the counter 250.

The CPU 110 which received the transfer position data gives the indication data to shift the image in the main scanning direction to the image processing section 120. According to the indication data, the image processing section 120 shifts the image data in the main scanning direction by a necessary amount, and supplies the image data to the writing section 130.

Figure 8:
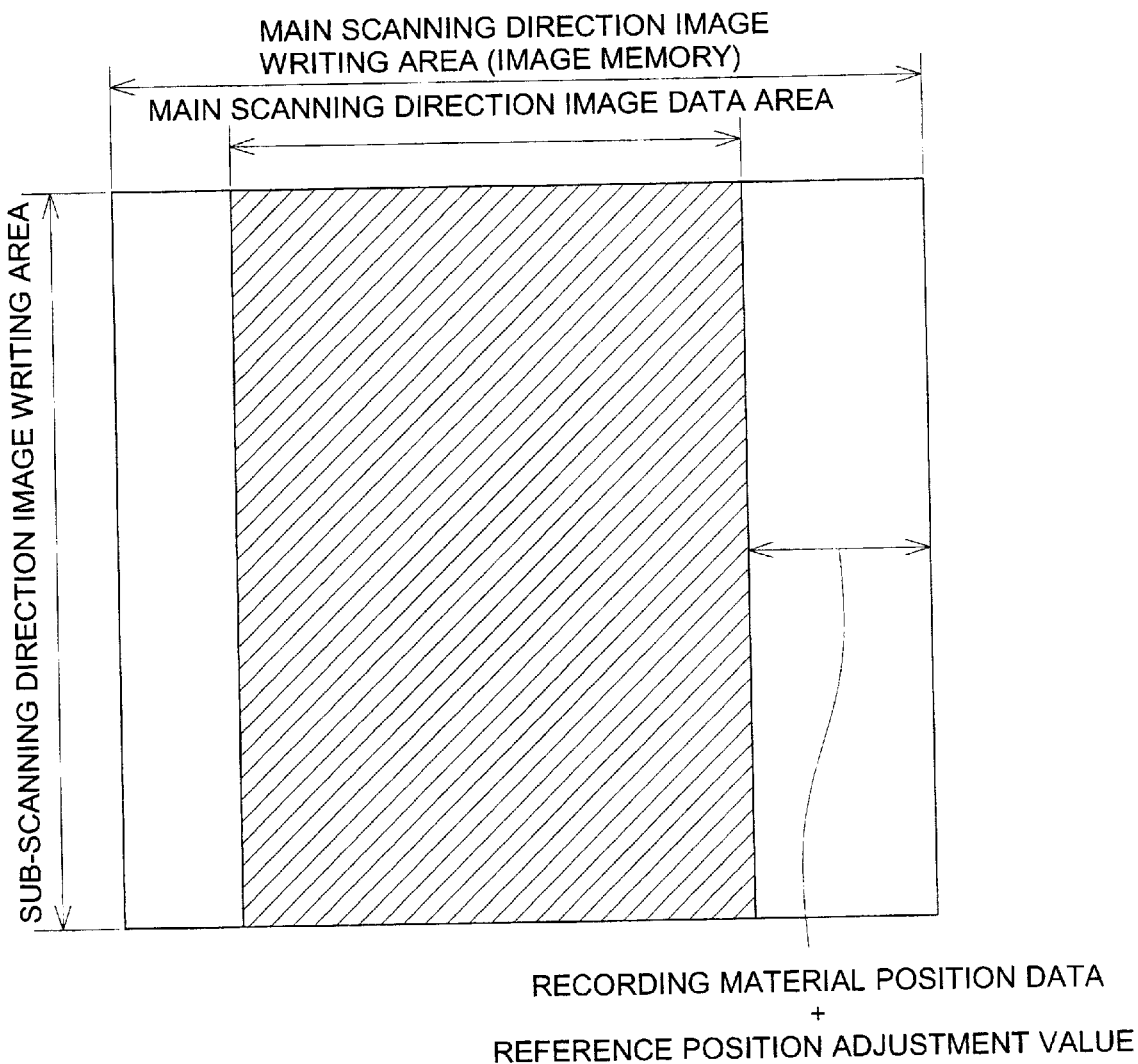
FIG. 8 is an illustration showing the condition of a memory at the time of operation of the image forming apparatus of the embodiment of the present invention.
Figure 9:
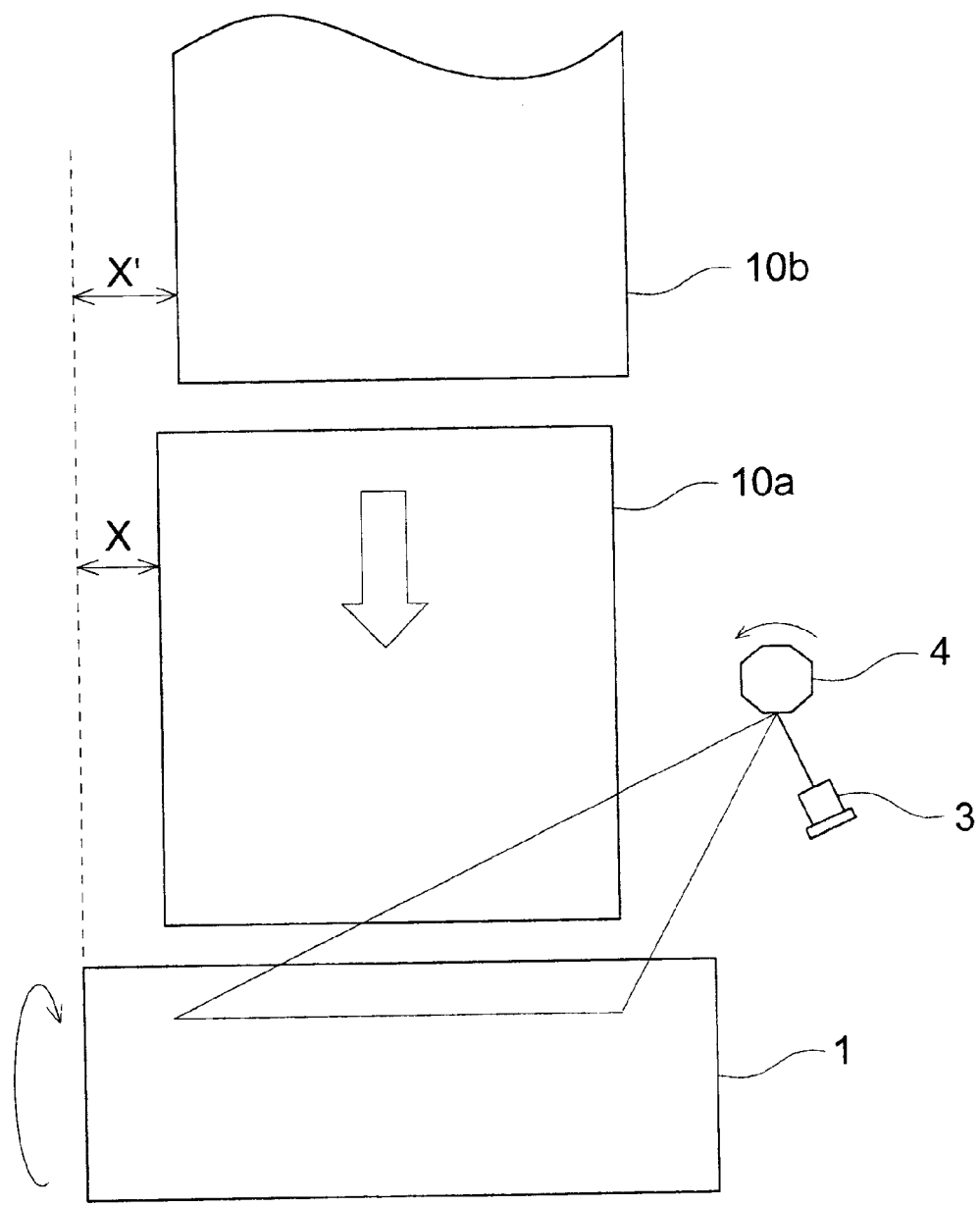
FIG. 9 is an illustration showing the condition at the time of operation of the image forming apparatus of the embodiment of the present invention.

Incidentally, the shift of the data as described above, can be met in such a manner that, as shown in FIG. 8, the an area in which the image data is actually written, is shifted in the image writing area in the main scanning direction of the image memory. In this case, it can be met when the write address is shifted corresponding to the necessary shift amount, and in the case of the read, the change is not necessary and the quick processing can be conducted. Herein, the reference position adjustment value is a value for the adjustment between the detection result by the position detection sensor and the laser writing point.

Accordingly, according to the writing control method, image forming apparatus and sensor of the embodiment described above, the following actions and effects are realized.

In the present embodiment, because the passing position of the recording material p in the main scanning direction is detected by the position sensor 220 as an absolute position, and the writing-position is determined according to the detection result, the stable image formation by the determination of the correct writing-position can be conducted notwithstanding the passing position or size of the recording material p.

Further, in the present embodiment, because the passing position of the recording material p in the main scanning direction is detected by the position sensor 220 structured by the close contact type line sensor as an absolute position, and the writing-position is determined according to the detection result, the stable image formation by the determination of the more correct writing-position than the conventional one, can be conducted notwithstanding the passing position or size of the recording material p.

Further, in the present embodiment, because the passing position of the recording material p in the main scanning direction is detected by the position sensor 220 structured by the clock operation type close contact type line sensor as an absolute position, and the writing-position is determined according to the detection result, the stable image formation can be conducted by counting the clocks, notwithstanding the passing position or size of the recording material p.

Further, in the present embodiment, by increasing the detection resolving power of the close contact type line sensor to more than 0.25 mm, the accuracy of about 100 dpi can be obtained, thereby, the stable image formation can be conducted due to the determination of the correct writing-position, notwithstanding the passing position or size of the recording material p.

Further, in the present embodiment, when the detection resolving power of the close contact type line sensor is made to integer times of the writing resolving power or the inverse number of integer times, the accuracy proportional to the writing resolving power is obtained, thereby, the stable image formation can be conducted due to the determination of the correct writing-position, notwithstanding the passing position or size of the recording material p.

Further, in the present embodiment, because the position sensor 220 is located on the downstream side of the register roller 185, the sheet skew is corrected, and determination of the correct writing-position can be made corresponding to the final passing position of the recording material p, thereby, the correct and stable image formation can be conducted.

Further, in the present embodiment, because the lighting of the LED light source 220a of the close contact type line sensor is in timed relationship with the drive of the register roller 185, the passing position of the recording material p can be detected without useless condition, and determination of the correct writing-position can be conducted, thereby, the correct and stable image formation can be conducted.

Further, in the present embodiment, because the lighting of the LED light source 220a of the close contact type line sensor is driven by using the clock by which the lighting is outputted during the drive of the register roller 185, thereby, the stable image formation can be conducted without generating unnecessary clock.

Further, in the present embodiment, by using the close contact type line sensor (refer to FIG. 4 and FIG. 5) for a range in which at least one end of the recording material p of the maximum size and one end of the recording material p of the minimum size are covered, the stable image formation can be conducted due to the determination of the correct writing-position, notwithstanding the passing position or size of the recording material p. When the size of the recording material p is constant, the close contact type line sensor may be arranged according to the maximum prospect amount of the passing position. Incidentally, in an example shown in FIG. 5, X corresponds to the transfer position data.

Further, in the present embodiment, because the passing position of the recording material p is detected at a predetermined timing after the leading edge of the recording material p is detected, the position in the condition that the recording material p actually passes, can be correctly detected, thereby, the stable image formation can be conducted due to the determination of the correct writing-position, notwithstanding the passing position or size of the recording material p.

Further, in the present embodiment, because the sensor output is made sample-hold, and compared to a predetermined value, and the sheet end portion of the recording material p is detected, the position in a condition that the recording material p is actually passing can be correctly detected, thereby, the stable image formation can be conducted due to the determination of the correct writing-position, notwithstanding the passing position or size of the recording material p.

Further, in the present embodiment, because the count of the drive clock is stopped at the change point of the comparator 240, the position in a condition that the recording material p is actually passing can be correctly detected, thereby, the stable image formation can be conducted due to the determination of the correct writing-position, notwithstanding the passing position or size of the recording material p.

Further, in the present embodiment, because the counter 250 to detect the passing position of the recording material p is arranged in the vicinity of the position sensor 220, a wiring having a possibility of the noise generation is very short. Then, because the output of the comparator 240 which is the detection result, is transmitted by a serial communication, the data can be transmitted even when the number of wiring is small, and in a portion in which the length of the wiring is long, a possibility of the noise generation can be decreased.

Further, in the present embodiment, because the data at the passing position of the recording material p is compared to a predetermined value, thereby, the stable image formation can be conducted due to the determination of the correct writing-position, notwithstanding the passing position or size of the recording material p.

As described above, in the present embodiment, by the control of the writing-position so as to automatically determine the writing-position, by detecting the offset of the recording material p by the end position detection means 200, and by shifting the image data in the main scanning direction by controlling the image processing section 120 according to the detection result, the automatic offset correction is conducted on the offset of the recording material p.

Next, the control of the writing-position in the embodiment of the present invention will be described. In the present embodiment, by adding the correction to the control of the writing-position by which the writing-position is controlled corresponding to the offset of the recording material p, the image is formed always at an appropriate position, and even in the case where the recording sheet deviates from its regular position and conveyed, the control of the writing-position is conducted so that the image position does not deviate from its regular position.

Figure 10:
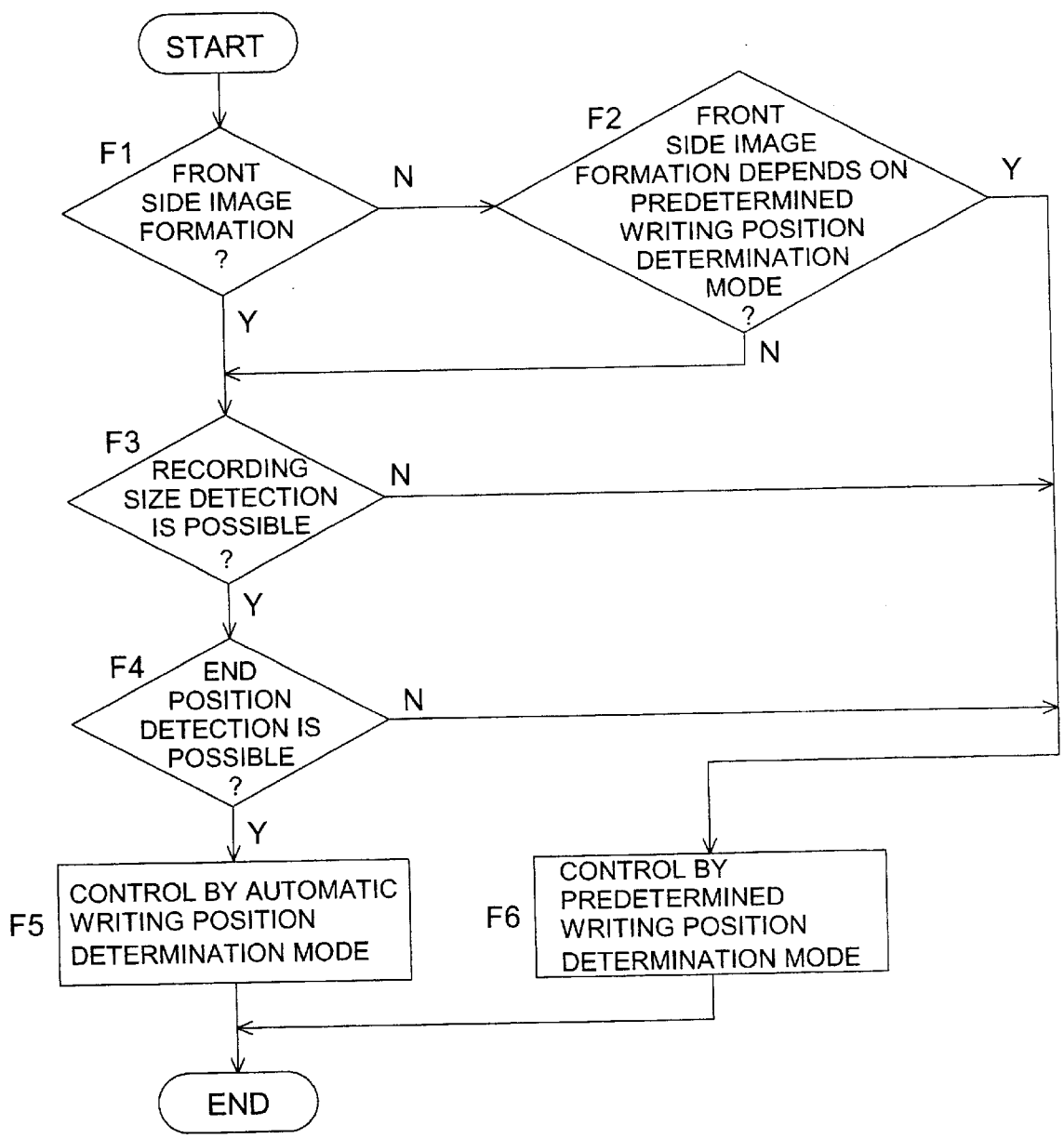
FIG. 10 is a flow chart of the control of the automatic writing-position determination in the embodiment of the present invention.

FIG. 10 is a flow chart of the control of the writing-position in the embodiment 1. As shown by F5 and F6 in FIG. 10, in the present embodiment, there are cases in which the control of the writing-position is conducted by the automatic writing-position determination described above, and it is conducted without depending on the automatic writing-position determination. The automatic writing-position determination is as described above, and the case in which the writing-position is controlled without depending on the automatic writing-position determination, will be described later.

Initially, the judgement whether the control of the writing-position is conducted by the automatic writing-position determination mode in F5, or the judgement whether the control of the writing-position is conducted by a predetermined writing-position determination mode in F6, that is, the judgement in F1, F2, F3 and F4 will be described.

(a1)The judgement according to whether the size of the recording material p can be detected (F3)

When the size of the recording material p can be detected, the control of the writing-position is conducted by the automatic writing-position determination mode in F5, and when it can not be conducted, the control of the writing-position is conducted by a predetermined writing-position determination mode in F6.

Figure 11:
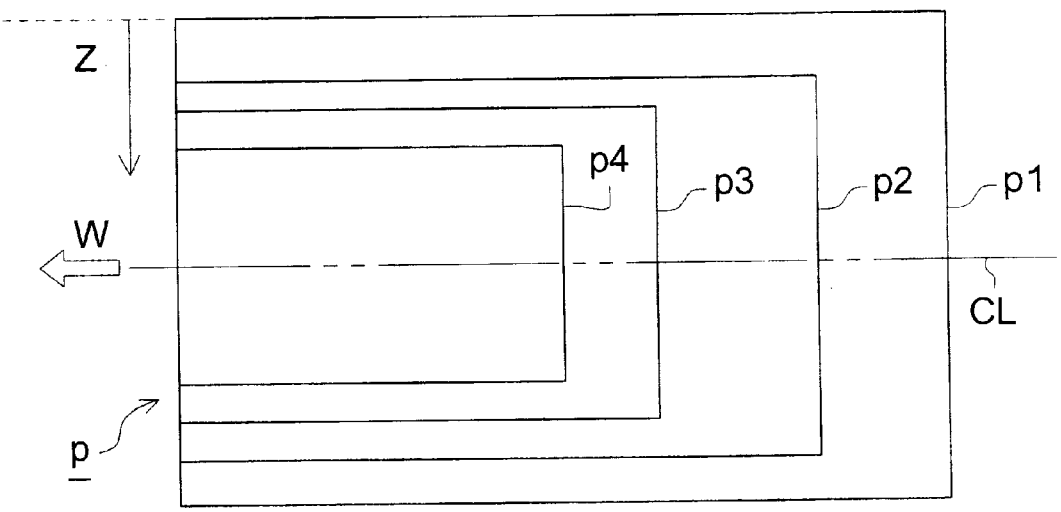
FIG. 11 is a view showing the condition of the conveyance of the recording material in the embodiment of the present invention.

In the present embodiment, as shown in FIG. 11, each size recording material of p1, p2, p3, and p4 is position controlled so that the center lines of them coincide with each other, and conveyed in the direction shown by W. Accordingly, the end position of the width direction (the direction shown by Z in the drawing) of the recording material p is different depending on each size, and the writing start position in the main scanning direction at the time of writing is also different depending on each size. As described above, because the writing-position is different depending on the size of the recording material p, it is necessary that the size of the recording material p is grasped for the determination of the writing-position.

Figure 12:
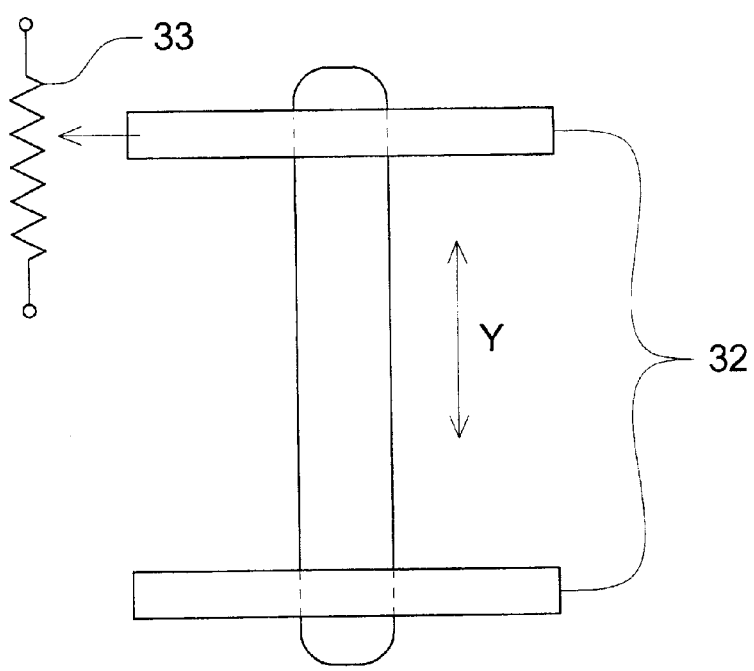
FIG. 12 is a view showing a size detection mechanism of the recording material in the embodiment of the present invention.

On the one hand, the size of the recording material p is detected according to the information obtained by detecting the length in the width direction of the recording material p by the detection mechanism shown in FIG. 12. In FIG. 12, numeral 32 is a side edge regulation plate which is provided on the sheet feed cassette 30 and manual feeding sheet feed tray 31, and can be moved in the Y direction, and the position of the side edge regulation plate 32 is converted into the change of the voltage by the resistance 33, and the length of the width direction of the recording material p is detected. It is difficult that such the size detection mechanism is made highly accurate, and it is difficult that the difference in the length of the recording material p in mm unit is grasped. The discrimination of the regular size such as the sizes in A series, B series, or inch series is fully possible by the size detection mechanism shown in FIG. 12, however, it is not in smaller cases that the discrimination of the size out of the regular size is, from the above reason, difficult in the detection by the size detection mechanism shown in FIG. 12. That is, there is a case in which the detection of the size in the case of the irregular size can not be conducted.

Accordingly, in the case of the irregular size, there is a case in which the writing-position can not be controlled by the automatic writing-position determination. In this case, the control of the writing-position without depending on the predetermined writing-position determination mode in F6 is conducted.

In the image forming apparatus, a sheet feed section into which the irregular size recording material p is loaded is specified. In the present embodiment, the manual feeding sheet feed tray 31 is specified as the sheet feed section into which the irregular size recording material p can be loaded. In other sheet feed cassettes 30A, 30B, and 30C, the recording material other than the regular size recording material p, can not be loaded. Accordingly, in the present embodiment, the CPU 110 which is an automatic selection means for selecting the automatic position determination mode or the predetermined position determination mode from the using sheet feed means, controls the writing-position by the automatic writing-position determination of F5 when the recording material p is fed from the sheet fed cassette 30A, 30B or 30C, and when the recording material p is fed from the manual feeding sheet feed tray 31, the writing-position is controlled by the predetermined writing-position determination of F6. In F3, the judgement according to the information of such the sheet feed means is conducted. It is of course possible that any one of sheet feed cassette 30A, 30B or 30C is also set to the sheet fed section of the irregular size recording material.

Further, there is a case where the irregular size mode is set from the setting section 70 of the image forming apparatus, and the writing correction without depending on the automatic writing-position determination of F6 is conducted by the setting. In this control, the CPU 110 selects the control means of the writing-position corresponding to the setting of the mode in the setting section 70. The setting section 70 structures the manual selection means.

(b1) The judgement according to whether the detection of the end position of the recording material p can be conducted by the position sensor 220 (F4).

In the case of the transparent sheet such as OHP recording material, because the edge of the recording material p can not be detected, the offset of the recording material p can not be detected. Further, when the sheet on which a framework or line is printed, is used as the recording material, there is a possibility that the framework or line are mis-detected as the edge of the recording material p. Accordingly, when the recording material p is the transparent sheet or the sheet on which the framework or line is printed, it is judged as N in F4 and the control of the writing-position by the automatic writing-position determination is not conducted, and F6 is selected.

It is judged according to the setting of the mode conducted in the setting section of the image forming apparatus, whether the recording material p used for the image formation is the transparent sheet. In this case, the setting section 70 structures the manual selection means. Alternatively, the sensor to detect that the recording material p is the transparent sheet, is provided on the sheet feed means, and the judgement of F4 may be conducted by the signal from the sensor. In this case, the sensor to detect the transparent sheet structures the discrimination means, and the CPU 110 to select the writing-position determination mode according to the sensor structures the automatic selection means.

Further, when the sensor detects that the end position of the recording material p deviates more than a predetermined value (for instance, ±4 mm) from the original passage position of the recording material p, it is also applicable that the recording material p is judged as the transparent sheet or the sheet with a framework, and the writing-position is controlled by the predetermined writing-position determination, instead of the automatic writing-position determination.

(c1) The judgement in the rear side image formation when the correction is conducted by the control of the writing-position without depending on the automatic writing-position determination in the front side image formation, in the two-side mode by which the image is formed on both front and rear sides of the recording material p (F1, F2).

In the front side image formation, when the writing-position is controlled by the predetermined writing-position determination, also in the rear side image formation, the control of the writing-position of F6 by the predetermined writing-position determination mode is conducted (Y in F2). The selection of such the writing-position determination mode is conducted by the CPU 110, and the CPU 110 structures the automatic selection means.

Next, the control of the writing-position to determine the writing-position in the main scanning direction by the predetermined writing-position determination mode will be described. As such the control of the writing-position, there are following controls.

(a2) To set in the predetermined writing-position. There is a case where a specific size recording material is used in the high frequency, as the irregular size recording material. For example, the computer sheet, or the oversized sheet is not the regular size recording material, however, it is the recording material whose size is specified. For such the recording material, the specific sheet mode is provided, and by selecting the specific sheet mode in the setting section 70 of the image forming apparatus, as the writing-position, the writing-position provided for the specific sheet is set.

(b2) To set the writing-position manually.

For the irregular size, when the control of the regular size which is closest to the irregular size is applied, the image formation with the variation of the image position within the allowable range can be conducted. Accordingly, for the irregular size recording material p, when the mode to form the image by the regular size processing is provided, by selecting the mode, the control of the writing-position set for each size can also be conducted. When this mode is called the regular processing mode, the regular processing mode conducts the processing to allot the continuous size data obtained by, for example, the detection mechanism shown in FIG. 12, to the regular size such as p1, p2, p3 or p4, for example, as shown in FIG. 11. The writing-position is determined according to the size data allotted in this manner.

(c2) The correction control of the writing-position by the previous data.

The offset in the conveyance of the recording sheet shows a specific inclination depending on each image forming apparatus. Further, there is a case where such the inclination shows a specific inclination depending on each sheet feed section in the image forming apparatus. Furthermore, there is also a case where a specific inclination is shown depending on each size of the recording material p. The offset data of the recording material p is stored in the non-volatile memory provided in the image forming apparatus, and each kind of the above inclinations are calculated by the statistical processing, and according to the calculation result, the correction of the writing-position can be conducted. As the other method, without depending on the complicated processing as described above, a method in which the optimum correction value is simply obtained from the offset data in the previous predetermined number of the image forming processes, can be adopted.

In the control of the writing-position in F6, the selection of any one of the above (a), (b) or (c) is conducted according to the judgement in F1–F3. For example, for the control of the writing-position when the recording material p from the specific sheet feed section is used, the control to determine at the writing-position specified to the specific sheet feed section is conducted. Further, the OHP sheet is used, the size of the recording material to be used is set from the setting section 70, and the control to determine at the writing-position specified to the set size is conducted.

In the present embodiment, the correction to the automatic writing-position determination as described above is conducted, and the control of trigger of the end position detection means 200 is conducted, which will be described below, thereby, the reliability of the offset detection is increased.

In the present embodiment as described above, by sampling the output of the comparator 240 by the leading edge detection sensor 190 as the leading edge detection means as shown by (5) in FIG. 6, the end position detection means 200 is triggered, however, in the case of the small sized recording material such as the post card size, or in the case of the transparent sheet for the OHP, there is a case where the leading edge detection sensor 190 can not detect the leading edge of the recording material p. In the present invention, in such the case, the end position detection means 200 is triggered not by the leading edge detection signal of the leading edge detection sensor 190, but by the time set by a timer which starts at the specific stage in the conveyance process of the recording material p. That is, as shown by (6) in FIG. 6, according to turning ON of the register roller 185, after the predetermined time from ON of the register roller 185, the end position detection means 200 is triggered. This control is conducted by the CPU 110 as the trigger means. The register roller 185 is an example of a synchronous conveyance means which is in timed relationship with the image formation on the photoreceptor drum 51 and conveys the recording material p.

Figure 13:
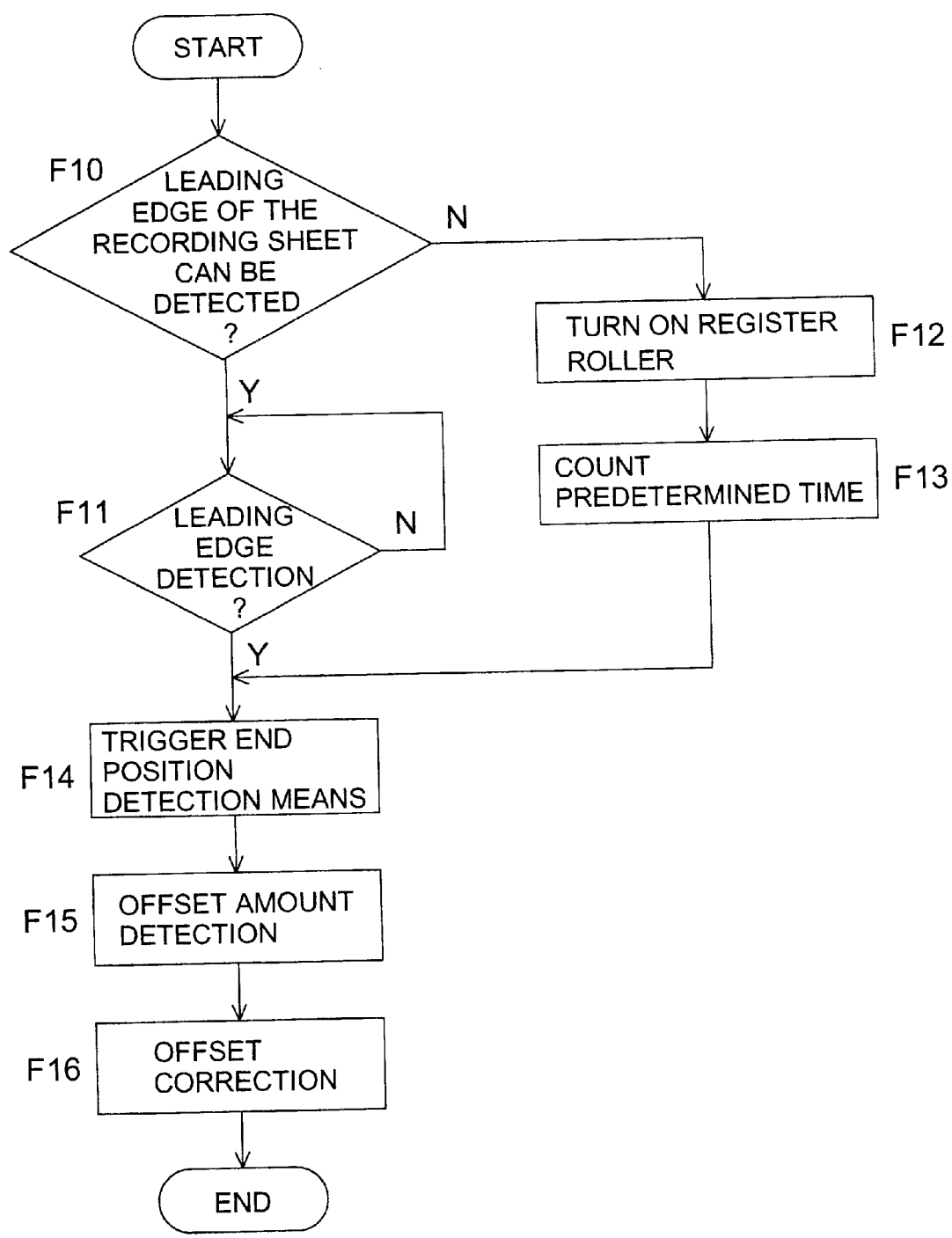
FIG. 13 is a flow chart of the trigger control of the end position detection means in the embodiment of the present invention.

FIG. 13 is a flow chart of such the trigger control of the end position detection means 200.

In F10, the leading edge detection sensor 190 judges whether the leading edge detection can be detected. This judgement is conducted by the size detection of the recording material p, or according to the information of the kind of the recording material p. That is, when the size of the recording material p is small like as the post card, or the recording material p is the transparent sheet like as the OHP sheet, N is judged in F10, and in the other case, Y is judged.

In the case where Y is judged in F10, when the leading edge sensor 190 detects the leading edge (F11), the end position detection means 200 is triggered (F14), the end position detection means 200 detects the offset amount (F15), and the offset amount correction is conducted (F16).

When N is judged in F10, the information of ON of the register roller 185 to start the register roller 185 is obtained (F12), and the timer is started. After the predetermined time by the timer has passed, the end position detection means 200 is triggered.

As described above, for the recording material p whose leading edge can not be detected like as the post card or OHP sheet, because the end position detection means 200 is triggered according to ON of the register roller 185, the end position detection means 200 operates correctly notwithstanding the size and kind of the recording material p.

According to the present invention detailed above, the following effects can be obtained.

Even when the method to control the writing-position by the automatic writing-position determination according to the information of the end position of the recording material detected by the end position detection means, is not effective, because the adequate writing-position control can be conducted, the image can be always formed at an adequate position on the recording material.

Because the control of the writing-position by the automatic writing-position determination and the control of the writing-position not depending on the automatic writing-position determination, are automatically selected the control of the image position to form the image always at a correct position on the recording material is automatically conducted, thereby, the image forming apparatus which is easily used, is realized.

Because the automatic writing-position determination function can be turned OFF manually when necessary, the mis-operation is prevented, and the image forming apparatus having the highly reliable image position control function is realized.

Even in the image formation using the irregular size or specific kind of recording material, the image can be formed always at a correct position.

Even in the case where the special recording material such as the OHP sheet is used, the image can be formed at an adequate position.

Even in the case of the document having a black framework image or reversal image, the image can be formed at a correct position.

When the image is formed on two-sides of the front and rear of the recording material, by combining the processing in the front side image formation and the rear side image formation with each other for the control of the image position, the possibility that the difference is generated between the image positions of the front side and the rear side, is lowered, thereby, the good quality image can be effectively obtained.

The image can be formed at an appropriate position, when the correction of the writing-position by the offset correction is not effective.

The image can be formed at an appropriate position, when the correction of the writing-position by the offset correction is not effective.

The end position detection means is correctly operated for all of various kinds of sizes of the recording materials, thereby, the highly reliable automatic writing-position determination can be conducted.

When necessary, because the operation mode can be set in the end position detection means, the mis-operation of the automatic writing-position determination apparatus can be securely prevented.

For various recording materials, the end position detection means for controlling the image position can be normally functioned.

For various recording materials, the end position detection means for controlling the image position can be normally functioned, and further, the automatic image position determination mode can be released, thereby, the mis-operation can be securely prevented.

Even when the detection of the leading edge of the recording material can not be conducted, or difficult, the end position detection means is normally operated, and for various sizes and kinds of recording materials, the automatic image position determination function is correctly operated.

What is claimed is:

1. An apparatus for forming an image on a recording material, comprising:
   an image forming section to perform an image writing operation for writing scanning lines in a main-scanning direction onto said recording material, while conveying said recording material in a conveyance direction of said recording material;
   an offset detecting section to detect an amount of a positional offset of said recording material, said positional offset being a positional deviation from a predetermined reference-position for said recording material in a direction orthogonal to said conveyance direction of said recording material; and
   a mode-selecting section to select either an automatic writing-position determining mode, in which said image forming section commences said image writing operation in said main-scanning direction from a writing-start position determined on the basis of a detected result of said offset detecting section, or a predetermined writing-position determining mode, in which said image forming section commences said image writing operation in said main-scanning direction from a predetermined writing-start position established in advance;
   wherein, when said offset detecting section can detect said positional offset of said recording material, said mode-selecting section automatically selects said automatic writing-position determining mode, while, when said offset detecting section cannot detect said positional offset, said mode-selecting section automatically selects said predetermined writing-position determining mode, and said image forming section performs said image writing operation in a mode selected by said mode-selecting section.

2. The apparatus as recited in claim 1, further comprising:
   a plurality of sheet feeding sections, from each of which said recording material is fed to said image forming section; and
   a manual sheet feeding section, from which an irregular size recording material is fed to said image forming section:
      wherein, when said recording material is fed from a specific sheet feeding section being one of said plurality of sheet feeding sections, said mode-selecting section selects said automatic writing-position determining mode, while when said recording material is fed from [a sheet section] said manual sheet feeding section, said mode-selecting section selects said predetermined writing-position determining mode.

3. The apparatus as recited in claim 1, further comprising:
   a discriminating section to discriminate a kind of recording material to be used;
      wherein, when said discriminating section determines that a specific kind of said recording material is currently used, said mode-selecting section selects said predetermined writing-position determining mode, while, when said discriminating section determines that a kind of said recording material other than said specific kind of said recording material is currently used, said mode-selecting section selects said automatic writing-position determining mode.

4. The apparatus as recited in claim 1,
   wherein, when image data for forming said image includes data that causes an error in detecting said positional offset of said recording material in a direction orthogonal to said conveyance direction, said mode-selecting section selects said predetermined writing-position determining mode.

5. The apparatus as recited in claim 1, wherein said apparatus has a duplex image forming function for forming images on both obverse and reverse sides of said recording material, and when forming a reverse image on a reverse side of said recording material on which an obverse image has already been formed on its obverse side by said predetermined writing-position determining mode, said mode-selecting section automatically selects said predetermined writing-position determining mode.

6. The apparatus as recited in claim 1, further comprising:

a size detecting section to detect a size of said recording material;

wherein, when said mode-selecting section selects said predetermined writing-position determining mode, said image forming section commences said image writing operation in said main-scanning direction based on a detected result of said size detecting section.

7. The apparatus as recited in claim 1, wherein said image forming section commences said image writing operation based on data of writing start positions, which were previously determined in image forming operations.

\* \* \* \* \*

UNITED STATES PATENT AND TRADEMARK OFFICE
CERTIFICATE OF CORRECTION

PATENT NO.    : 6,473,112 B1
DATED         : October 29, 2002
INVENTOR(S)   : Makoto UI et al.

It is certified that error appears in the above-identified patent and that said Letters Patent is hereby corrected as shown below:

<u>Title page,</u>
Item [30], Foreign Application Priority Data, change "Oct. 24, 1999" to -- Oct. 25, 1999 --.

Signed and Sealed this

Twelfth Day of August, 2003

JAMES E. ROGAN
*Director of the United States Patent and Trademark Office*